INVENTOR.
CHARLES H. QUELL

INVENTOR.
CHARLES H. QUELL

United States Patent Office 2,975,640
Patented Mar. 21, 1961

2,975,640

DYNAMIC BALANCING MEANS

Charles H. Quell, Stewart Manor, N.Y., assignor to Micro Balancing, Incorporated, a subsidiary of Giannini Scientific Corporation, Garden City Park, N.Y.

Filed June 28, 1956, Ser. No. 594,499

2 Claims. (Cl. 73—466)

This invention relates to dynamic balancing means and machines of the type using strobe lights and more particularly to such means using a synchronized local oscillator.

Prior systems have used strobe lights for determining the point of unbalance in dynamic balancing machines. These systems generally use a signal from one or more pick-offs to trigger the strobe light. This signal is not too suitable for this, since it is not a pure sine wave but contains a number of other peaked noise components due to the surface roughness of the rotating work piece and other sources of noise in the system. Therefore, in order to obtain a reliable signal for indexing the strobe light, a considerable amount of filtering is necessary to obtain the fundamental sine wave. This filtering introduces undesirable phase shifts which defeat the entire purpose since the phase angle of the sine wave is relied on to indicate the point of unbalance.

Another disadvantage of using the pick-off signal directly is that it is of greatly different amplitude for different test pieces and it is difficult to control the flashing of the strobe light in a reliable manner with different amplitude signals.

The present invention solves these problems by having a local oscillator of constant amplitude which is phased and slaved to the pick-off signal. Furthermore, no filtering of the pick-off signal is needed with its consequent erroneous phase shift.

Accordingly, a principal object of the invention is to provide new and improved dynamic balancing machines of the type using stroboscopic lights.

Another object of the invention is to provide new and improved dynamic balancing machines of the type using stroboscopic lights and using a local oscillator synchronized and phased by the pick-off signal.

Another object of the invention is to provide new and improved dynamic balancing machines of the type using stroboscopic lights having means for eliminating filters and consequent phase shift.

Another object of the invention is to provide new and improved dynamic balancing machines of the type using stroboscopic lights which eliminates filters and consequent phase shift and has constant amplitude means for triggering the strobe tube.

Another object of the invention is to mix the two signals obtained from the vibration pickups, electronically in such proportion and phase so that the resultant signal is indicative of amount and position or phase of unbalance in a preselected transverse correction plane of the test rotor.

These and other objects of the invention will be apparent from the following specification and drawings, of which:

Figure 1:
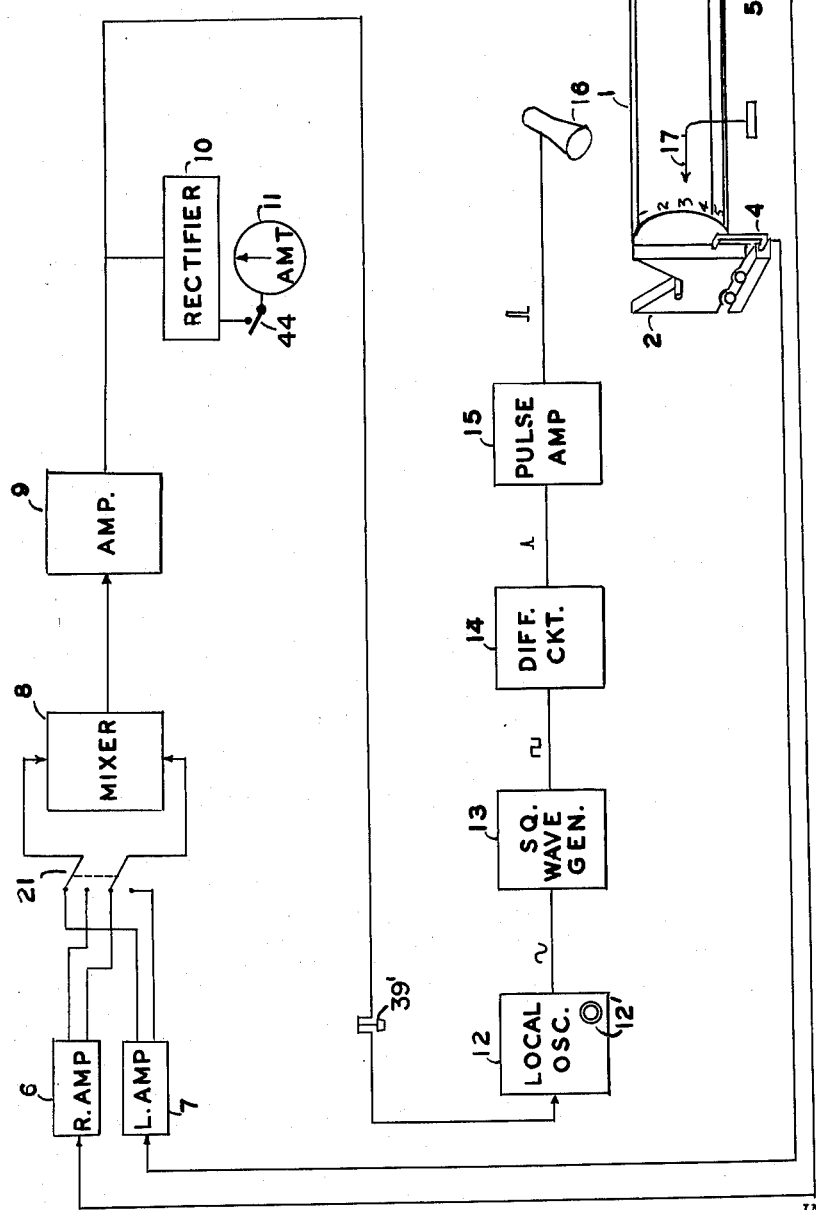
Figure 1 is a schematic block diagram of an embodiment of the invention.

Referring now to Figure 1, the rotatable work piece 1 to be tested is mounted in a pair of oscillatory work supports 2 and 3. These may be of the type having an upper portion supported on rollers with respect to a lower stationary portion. When the work piece 1 is rotated, any unbalance will cause vibrations in the two supporting means 2 and 3. Electrical signals proportional to the vibrations are generated by the pick-offs 4 and 5. The pick-offs may be conventional, and may be of the magnetic type or may be of the strain gage type having a flexible insulating member coated with an electrical conductor so that when it bends in one direction the resistance on that side will be less.

The unbalance signals have a sine wave fundamental plus a considerable amount of noise components as previously discussed.

The pickups 4 and 5 provide two signals, one of which may be called actual unbalance and the other apparent or spurious unbalance, crosstalk or tipping. For instance, assume a rotor has an unbalance in the left unbalance correction plane but no unbalance in the right unbalance correction plane. When the rotor is turned it will describe a circle at each end due to the unbalance at the left end only. The left pickup would therefore read a signal proportional to the unbalance and the right pickup would also read a signal proportional to the left unbalance even though no correction is needed in the right plane. This latter signal is variously referred to as a wobble or nodal signal or as a spurious signal or crosstalk or signal due to tipping. In the present device this latter signal is compensated for or cancelled out.

The signals from the two pick-offs 4 and 5 are fed to right and left amplifiers 6 and 7 where the wobble or nodal correction signals are developed and then to mixer 8 which combines the pickup signal and the nodal correction signal to provide a signal representative of the correction necessary.

The alternating voltage signal is then fed through amplifier 9 to a local oscillator 12 which is adapted to be synchronized by the input signal and is preferably of a type that is easily slaved by an input signal. The output of the local oscillator will be of constant amplitude, and all of the noise components will be eliminated without the phase shift caused by filtering as has been the prior practice. This signal is then squared in square wave generator 13, and a trigger is generated by differentiating circuit 14. The trigger signal is applied to a conventional pulse circuit 15, the output of which is used to flash the stroboscopic light 16.

The work piece has numbers or letters placed on its periphery as shown. For instance, assume the unbalanced weight is at the number 2. The time the number 2 passes through the horizontal plane is near the peak of the output from the oscillator 12. The phase shift caused between this point and the flashing of the light due to the squaring of the oscillator output is a known factor which is calibrated for.

The operation, in general, is as follows: The work piece is rotated at a predetermined speed by rotating the shaft 20 by a suitable motor not shown. The local oscillator 12 is then adjusted in frequency by the control 12' so that the strobe light makes the work piece appear to stand still. This gives a very accurate adjustment of the local oscillator frequency. The local oscillator is then slaved to the pickup signals for phasing. The switch 21 is switched to the left amplifier and a reading of the meter 11, and the number in the horizontal plane on the work piece will indicate the amount and location of the cut to be made at that end of the work piece.

Switch 21 is reversed to obtain a reading of the amount and location of the cut to be made at the other end. Detailed operation will be discussed in connection with Figure 2.

Figure 2:
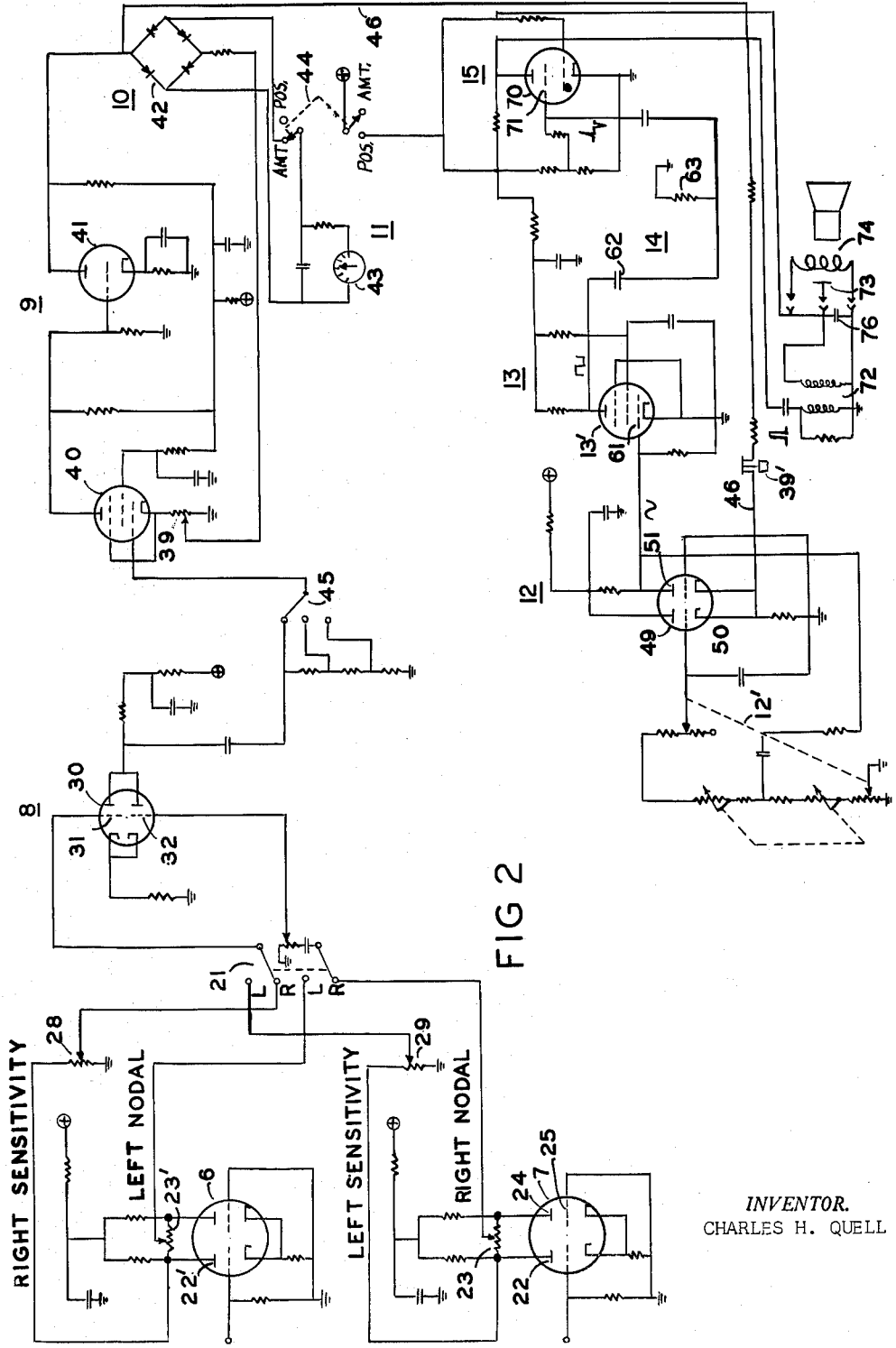
Figure 2 is a schematic circuit diagram of the embodiment of Figure 1.

Referring now to Figure 2, there is shown a schematic circuit diagram of the embodiment of Figure 1. The right and left amplifiers 6 and 7 comprise a pair of double triodes. The left unbalance or sensitivity signal is taken off the plate 22 and the right wobble or nodal correction signal is taken off the potentiometer 23 connected between the triode plates 22 and 24. The grid 25 associated with plate 24 is connected to ground and both cathodes are connected together, thereby providing out of phase voltages at the plates 22 and 24, so that a nodal correction of either phase may be obtained on potentiometer 23.

The right amplifier 6 is similar to the left amplifier 7, the sensitivity signal being taken off the plate 22′ and the nodal signal from the potentiometer 23′ as described in connection with amplifier 7. Right and left sensitivity adjustments 28 and 29 are provided which will be explained in connection with the operation.

These signals feed to double triode mixer 30 through the left-right switch 21. In the position shown of switch 21, the sensitivity signal including the nodal component from amplifier 6 is connected to the grip 31 or mixer tube 30, but only the nodal signal from amplifier 7 is connected to the grid 32. The wobble or nodal components may be made opposite in phase and therefore may be cancelled out, as will be explained, leaving only a desired net unbalance signal. This signal is fed to a meter circuit comprising amplifier stages 40 and 41, rectifier bridge 42, and meter 43, which gives a reading proportional to the amount of correction necessary when the switch 44 is in the "amount" position. The variable range attenuator 45 is provided to accommodate various magnitudes of signal, and gain may be adjusted by potentiometer 39.

When the switch 44 is in the "position" position, the error signal is connected via lead 46 to the cathode 50 of the oscillator 49. The other pole of switch 44 is connected to the plate supply voltage. The oscillator operates in conventional manner and is of a type which is easily coerced or synchronized in phase with the incoming error signal, the frequency of the oscillator having already been carefully adjusted by means of the control 12′ as previously discussed. The output of the oscillator is taken from the plate 51 which is connected to the grid 61 of the square wave generator tube 13′ which may be an over-driven amplifier or other conventional square wave forming circuit.

The output square wave it taken off the plate of tube 13′ and connected to a differentiating circuit comprising condenser 62 and resistor 63 which provides a sharp spike at the positive going edge of the square wave. This trigger voltage is connected to the grid 71 of gas tube 70 which provides a high voltage pulse through pulse transformer 72 to the electrode 73 of the strobe light 74 causing the condenser 76 to discharge through the strobe tube causing a flash of light on the work piece.

Calibration

Use a balanced rotor and add a known unbalanced weight of sufficient size in the right correction plane to get an unbalance amount reading. Adjust the right sensitivity control 28 dial to indicate the desired unbalance units on meter 43.

The known unbalance weight divided by the indicated unbalance units will determine the unbalance moment that each unbalance unit on meter 11 represents such as ounce-inches if ounce and inch units are used.

Switch the "unbalance" control switch 44 to "position" and adjust the strobe light flashing to make rotor appear to stand still. Now indicate the position of unbalance. Should the position pointer 17 not coincide with the added weight position, shift the pointer to indicate this spot.

Now switch the unbalance plane selector switch 21 to the "left" and adjust the "left nodal" control 23′ to get a minimum reading of unbalance units. Now shift the known unbalance weight from the right to the left correction plane. This must be exactly in the selected correction plane. Repeat the above operation adjusting the "left sensitivity" control 29 and the "right nodal" control 23.

Operation

The operation is as follows: Adjust position of strobe lamp 16 for operator's convenience and best illumination of marked portion of rotor. Adjust unbalance position pointer 17 near the marked portion of the rotor in a horizontal plane of the rotor axis for balancing speeds from 1200 to 3000 r.p.m.; somewhat below for less than 1200 r.p.m. Set "unbalance" switch 44 to "amount." Mark a series of numbers about the periphery of the rotor 1. This can also be done with numbered adhesive tape. Center sensitivity controls 28, 29, and nodal controls 23 and 23′.

The nodal control setting is as follows: To set the nodal controls 23 and 23′, run the rotor by switching on drive motor, not shown, and note the amount of unbalance units on meter 43 in the left and right correction plane with L-R switch 21. Now add an unbalance weight in the left correction plane at point of unbalance of the rotor and measure the amount on meter 11 in the right correction plane. If amount has changed from the previous reading, adjust the right nodal control 23 until the previous reading is indicated. This cancels the effect of one correction plane into the other. Now add the unbalance weight in the right correction plane and repeat above operation, indicating the amount and correcting the nodal control 23′ setting in the left correction plane.

Run the rotor and set the "unbalance" switch 44 to "position." Depress the "sync" button 39′ which opens lead 46 and slowly rotate the "sync" control 12′ from right to left until the flashing of the strobe lamp makes the rotor appear stationary. Now release the "sync" button. The numbers on the rotor will shift and the number lining up with the position pointer 17 will indicate the heavy spot of the rotor on one correction plane. Repeat in the other plane. Turn switch 44 to "amount" and measure amount on meter 43 in each plane, and make weight correction on left and right balancing planes of piece being balanced.

Therefore, the present invention utilizes a synchronized local oscillator to provide a voltage source for indexing the strobe light, thereby eliminating all noise components which might make the flashing of the light erratic without the necessity of any undesired or spurious phase shifting of the indexing sine wave such as would be caused by filtering.

I claim:

1. Dynamic balancing means of the type having a strobe light comprising means to rotate a workpiece containing two unbalance correction planes and supported in oscillatable work support means, left and right deflection pickups, one at each end of said work support means, each pickup being energized by the oscillations of the rotating workpiece to provide signals having components related to the actual unbalance in a respective correction plane and to an apparent unbalance in said respective correction plane caused by unbalance in the other correction plane, amplifier means connected to each of said pickup means including means to produce a signal to compensate for said apparent unbalance component in the other pickup signal, a mixer circuit, left-right switch means connected to said amplifier means to connect left unbalance signals and left compensating signals to said mixer when said switch is in left position and to connect right unbalance signals and right compensating signals to said mixer when said switch is in the right position, said mixer providing signals related to the actual unbalance in the correction planes, a tunable local vacuum tube oscillator, a switch to selectively connect or disconnect the oscillator to said mixer whereby the oscillator may be either independently tuned or synchronized to the mixer signals, and means to trigger said strobe light comprising a square wave generator connected to said local oscillator, differentiating circuit means connected to said square wave generator and pulse amplifier trigger circuit means connected to said differentiating circuit and connected to flash said strobe light.

2. Apparatus as in claim 1 wherein each of said amplifier means comprises a double triode vacuum tube, the cathodes of said vacuum tube being connected together, a potentiometer connecting the plates of said vacuum tube, the adjustable contact of said potentiometer being connected through said left-right switch to said mixer to provide said compensating signals.

References Cited in the file of this patent

UNITED STATES PATENTS

| | | |
|---|---|---|
| 2,165,024 | Baker | July 4, 1939 |
| 2,243,379 | Johnson | May 27, 1941 |
| 2,331,317 | Germeshausen | Oct. 12, 1943 |
| 2,451,863 | Oakley | Oct. 19, 1948 |
| 2,486,896 | Weaver et al. | Nov. 1, 1949 |
| 2,671,202 | Petroff | Mar. 2, 1954 |
| 2,711,647 | Orengo et al. | June 28, 1955 |
| 2,816,445 | Rambo | Dec. 17, 1957 |

FOREIGN PATENTS

| | | |
|---|---|---|
| 729,901 | Great Britain | May 11, 1955 |